(12) United States Patent
Sai (10) Patent No.: US 10,743,308 B2
(45) Date of Patent: Aug. 11, 2020

(54) VEHICLE-MOUNTED MILLIMETER-WAVE COMMUNICATION DEVICE AND COMMUNICATION METHOD

(71) Applicant: TOYOTA JIDOSHA KABUSHIKI KAISHA, Toyota-shi, Aichi-ken (JP)

(72) Inventor: Seii Sai, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 100 days.

(21) Appl. No.: 15/934,010

(22) Filed: Mar. 23, 2018

(65) Prior Publication Data

US 2018/0288763 A1 Oct. 4, 2018

(30) Foreign Application Priority Data

Mar. 30, 2017 (JP) ................................ 2017-067612

(51) Int. Cl.
*H04W 72/04* (2009.01)
*H01Q 3/04* (2006.01)
*H04W 4/40* (2018.01)
*H01Q 1/32* (2006.01)
*H01Q 3/24* (2006.01)
*H04B 7/06* (2006.01)
*H01Q 21/20* (2006.01)

(52) U.S. Cl.
CPC ...... *H04W 72/0446* (2013.01); *H01Q 1/3275* (2013.01); *H01Q 1/3283* (2013.01); *H01Q 3/04* (2013.01); *H01Q 3/24* (2013.01); *H04B 7/0602* (2013.01); *H04W 4/40* (2018.02); *H01Q 1/32* (2013.01); *H01Q 21/205* (2013.01)

(58) Field of Classification Search
CPC ...... H04W 72/0446; H04W 4/40; H01Q 3/04; H01Q 1/3275; H04B 7/0602
USPC .......................................................... 455/78
See application file for complete search history.

(56) References Cited

U.S. PATENT DOCUMENTS

| 5,349,360 A | 9/1994 | Matsui |
| 9,922,554 B2* | 3/2018 | Mikuni ................ G08G 1/0137 |
| 2011/0205969 A1 | 8/2011 | Ahmad et al. |
| 2016/0334501 A1* | 11/2016 | Ling ..................... G01S 13/931 |

(Continued)

FOREIGN PATENT DOCUMENTS

| EP | 3 002 655 A1 | 4/2016 |
| JP | 2001-036444 A | 2/2001 |
| JP | 2004-214864 A | 7/2004 |

(Continued)

*Primary Examiner* — Ayodeji O Ayotunde
(74) *Attorney, Agent, or Firm* — Oliff PLC (57) ABSTRACT

Appropriate communication suitable for various situations is performed in millimeter wave communication for vehicles. A vehicle-mounted millimeter-wave communication device mounted on a vehicle and performing communication while temporally changing a communication direction by using an antenna unit capable of changing directivity includes: a running environment acquisition unit configured to acquire a running environment including at least one of a road condition of a road on which the vehicle is running and a vehicle state of the vehicle; and a communication control unit configured to perform control such that communication, in which a communication time allocated to each communication direction is determined in accordance with the running environment, is performed.

12 Claims, 6 Drawing Sheets

(56) References Cited

U.S. PATENT DOCUMENTS

2016/0381571 A1\* 12/2016 Koravadi ............. H04B 7/0617
           348/148
2017/0149130 A1\* 5/2017 Kim .................. H01Q 21/0056

FOREIGN PATENT DOCUMENTS

| JP | 2005-174237 A | 6/2005 |
| JP | 2007-527125 A | 9/2007 |
| KR | 10-1709076 B1 | 2/2017 |
| WO | 2006/021235 A1 | 3/2006 |
| WO | 2016/032359 A1 | 3/2016 |

\* cited by examiner

FIG. 1

FIG. 2A  EXTERNAL VIEW OF ANTENNA

FIG. 2B  CONFIGURATION DIAGRAM

FIG. 2C  MODIFICATION

COMM. TIMES ARE ALLOCATED TO RESPECTIVE DIRECTIONS EQUALLY
(DEFAULT SETTING, DURING PASSAGE THROUGH INTERSECTION)

FIG. 5B

LONG COMM. TIMES ARE SET FOR FORWARD AND BACKWARD DIRECTIONS
(EXPRESSWAY/STRAIGHT ROAD, DURING HIGH-SPEED RUNNING)

FIG. 5C

LONG COMMUNICATION TIME IS SET FOR BACKWARD DIRECTION
(DURING REVERSE DRIVING TO PUT VEHICLE INTO GARAGE)

VEHICLE-MOUNTED MILLIMETER-WAVE COMMUNICATION DEVICE AND COMMUNICATION METHOD

BACKGROUND OF THE INVENTION

Field of the Invention

The present invention relates to millimeter wave communication, and more particularly relates to communication control that enables efficient communication in roadside-to-vehicle and vehicle-to-vehicle communication.

Description of the Related Art

The use of millimeter waves (a band from 24 GHz to 86 GHz) is proposed to implement high-capacity communication in the next generation mobile communication system (5G). The millimeter wave has high straightness, and hence it is necessary to appropriately adjust a communication direction (directivity) to perform communication.

Japanese Patent Application Publication No. 2004-214864 (PTL1) describes a technique related to a communication antenna for a wireless LAN in a 2.4 GHz or 5.8 GHz band, and discloses that communication quality is maintained by changing the directivity of the antenna depending on the situation. Specifically, PTL1 discloses that communication with a communication partner is allowed with high quality by adjusting the directivity of the antenna even in the case where an obstacle is present.

Japanese Patent Application Publication No. 2001-36444 (PTL2) discloses that, to overcome a problem that received power attenuates due to interference between a direct wave and a reflected wave reflected by a road surface, a plurality of antennas are installed such that the heights of the antennas from the ground are different from each other.

However, in roadside-to-vehicle and vehicle-to-vehicle communication, the position of a communication partner to which radio waves are to be transmitted or from which radio waves are to be received changes depending on the situation. In conventional arts, communication with the communication partner of which the position is fixed is assumed, or the transmission direction of the antenna is fixed, and hence it is not possible to change the communication direction depending on the situation.

Patent Literature 1 (PTL 1): Japanese Patent Application Publication No. 2004-214864

Patent Literature 2 (PTL 2): Japanese Patent Application Publication No. 2001-36444

SUMMARY OF THE INVENTION

An object of the present invention is to perform appropriate communication suitable for various situations in millimeter wave communication for vehicles.

A first aspect of the present invention is a vehicle-mounted millimeter-wave communication device mounted on a vehicle and performing communication while temporally changing a communication direction by using an antenna unit capable of changing directivity including: a running environment acquisition unit configured to acquire a running environment including at least one of a road condition of a road on which the vehicle is running and a vehicle state of the vehicle; and a communication control unit configured to perform control such that communication, in which a communication time allocated to each communication direction is determined in accordance with the running environment, is performed.

The direction in which communication is to be performed differs depending on the running environment of the vehicle, and hence, by allocating a longer communication time to the direction in which the communication is to be performed depending on the situation, it becomes possible to communicate with a communication partner positioned in the direction more reliably.

For example, it is required to communicate with the communication partners positioned in forward and backward directions in the case where the vehicle is running on a straight road, and it is also required to communicate with the communication partner positioned in a direction other than the forward and backward directions in the case where the vehicle is running on a road near an intersection. To cope with this, the running environment acquisition unit may acquire the road condition of the road on which the vehicle is running as the running environment, and the communication control unit may set a communication time longer than a communication time set for another direction for each of the forward and backward directions in the case where the vehicle is running on the straight road, and may set communication times for all directions equally in the case where the vehicle is passing through the intersection.

In addition, it is required to perform communication in the forward and backward directions more reliably as the running speed of the vehicle is higher. To cope with this, the running environment acquisition unit may acquire the running speed of the vehicle as the running environment, and, in the case where the running speed is not less than a threshold value, the communication control unit may set a longer communication time, which is longer than the communication time set for the other direction, for each of the forward and backward directions than in the case where the running speed is less than the threshold value.

Further, on a freeway (including an expressway), the vehicle often moves at high speed, and the freeway is often the straight road. Consequently, it is preferable to be able to perform the communication in the forward and backward directions more reliably than in the case where the vehicle is running on a general road. To cope with this, the running environment acquisition unit may acquire the road condition of the road on which the vehicle is running as the running environment, and, in the case where the vehicle is running on the freeway, the communication control unit may set a longer communication time, which is longer than the communication time set for the other direction, for each of the forward and backward directions than in the case where the vehicle is running on the general road.

In addition, in the case where the vehicle is running by using electric power stored in a battery, importance of communication in left and right directions is increased so that the vehicle can communicate with a charging station installed on the roadside. This importance is increased as remaining battery power is lower. To cope with this, the running environment acquisition unit may acquire indication of whether or not the vehicle is in a driving mode that uses a battery as a power source as the running environment, and, in the case where the vehicle is in the driving mode that uses the battery as the power source, the communication control unit may set the communication times for all the directions more equally than in the case where the vehicle is not in the driving mode that uses the battery as the power source. Alternatively, the running environment acquisition unit may acquire the remaining battery power of the vehicle as the running environment, and, in the case where the remaining battery power is not more than a threshold value, the communication control unit may set the communication times for all the directions more equally than in the case where the remaining battery power is more than the threshold value.

In the present aspect, in the case where it is determined that the communication time longer than the communication time set for the other direction is set for a specific direction based on the running environment, the communication control unit may perform control such that communication in which the communication time longer than the communication time set for the other direction is set for the specific direction and communication in which the communication times are set for all the directions equally are performed alternately.

It is possible to perform communication in the direction having high importance reliably at high throughput by allocating the communication times in this manner, and it is possible to keep communication with another communication partner (e.g., a new communication partner) by setting the communication time for the other direction.

As an antenna unit in the present aspect, it is possible to use, e.g., a plurality of fixed antennas directed in different directions. Although the directivity of each fixed antenna cannot be adjusted, the communication control unit can adjust the directivity by selecting the antenna to be used, and can change the setting of the communication time of each direction by adjusting a time period during which each fixed antenna is selected.

As another example of the antenna unit in the present aspect, it is possible to use a rotary antenna. The communication control unit can adjust the directivity by rotating the antenna, and can change the setting of the communication time of each direction by adjusting a rotation speed at each angle (orientation).

As still another example of the antenna unit in the present aspect, it is also possible to use an array antenna having multiple elements. The communication control unit can adjust the directivity by beamforming, and can change the setting of the communication time of each direction by adjusting the directivity and the direction of the directivity.

Note that the present invention can be viewed as a vehicle-mounted millimeter-wave communication device that includes at least part of the above units. The present invention can also be viewed as a radio communication method that executes at least part of the above processes. In addition, the present invention can also be viewed as a computer program for causing a computer to execute the method, or a computer-readable storage medium in which the computer program is stored non-transitorily. The above-described units and processes can be adopted in combination, where feasible, to constitute the present invention.

According to the present invention, in millimeter wave communication for vehicles, it is possible to implement appropriate communication suitable for various situations.

DESCRIPTION OF THE EMBODIMENTS

First Embodiment

The present embodiment relates to a vehicle-mounted millimeter-wave communication device that performs communication by using millimeter waves. The vehicle-mounted millimeter-wave communication device is mounted on a vehicle. In the present specification, the vehicle on which the vehicle-mounted millimeter-wave communication device is mounted is referred to as a host vehicle. In the present specification, the "millimeter waves" mean radio waves in a band from 24 GHz to 86 GHz. The millimeter wave has high straightness, and hence it is necessary to appropriately control a communication direction. In particular, a positional relationship with a communication partner frequently changes in a vehicle environment. The present embodiment uses a communication device and a communication method suitable particularly for such a vehicle environment.

Configuration

Figure 1:
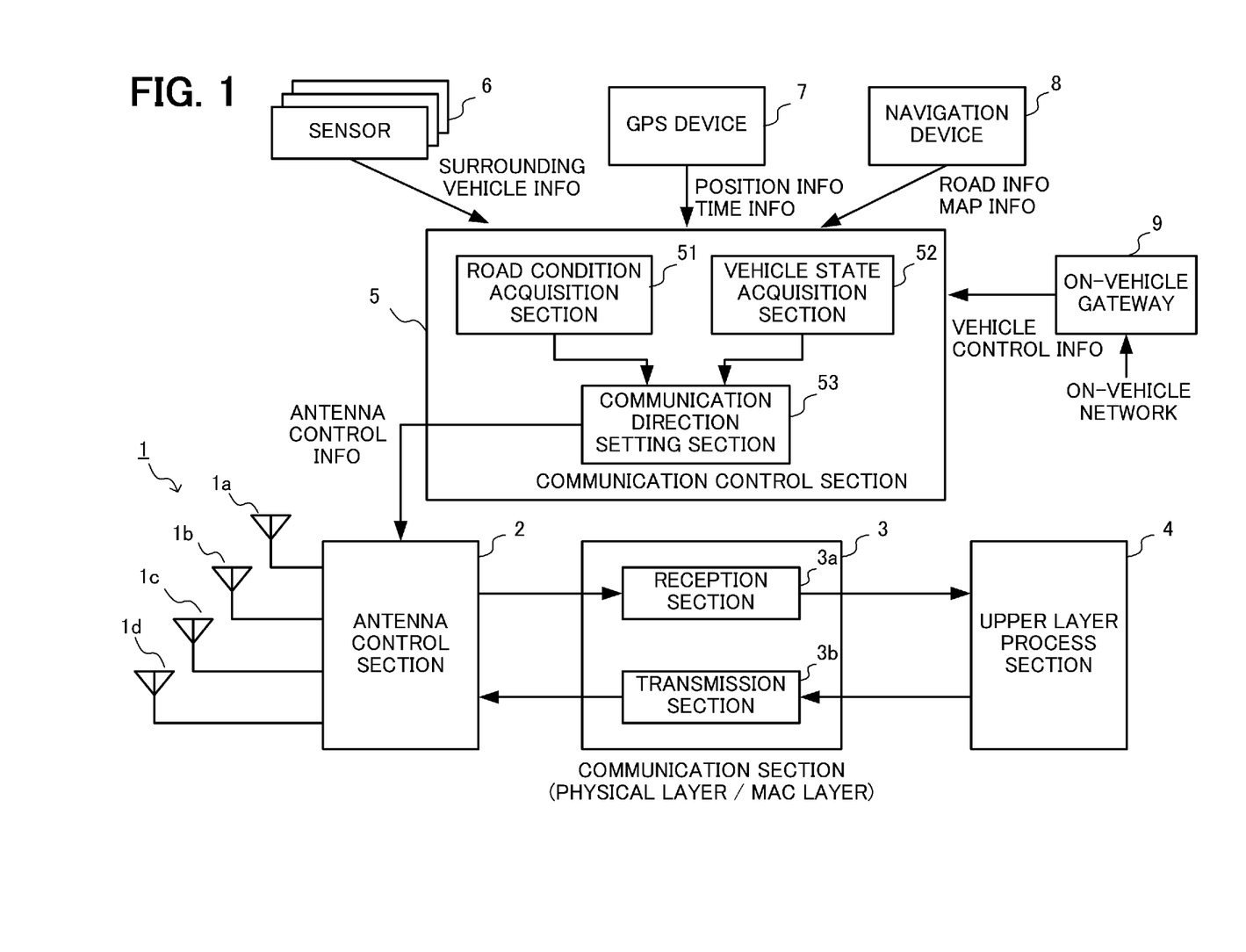
FIG. 1 is a block diagram showing the configuration of a vehicle-mounted millimeter-wave communication device according to an embodiment.

FIG. 1 is a view showing the configuration of the vehicle-mounted millimeter-wave communication device of the present embodiment. As shown in FIG. 1, the vehicle-mounted millimeter-wave communication device according to the present embodiment includes an antenna unit 1, an antenna control section 2, a communication section 3, an upper layer process section 4, and a communication control section 5. The communication control section 5 is configured to be capable of acquiring information from various sensors 6, a GPS device 7, and a navigation device 8 in addition to the upper layer process section 4. The communication control section 5 is also configured to be capable of acquiring information related to a control state of a vehicle from a vehicle network (e.g., a CAN network) via an on-vehicle gateway 9.

In the present embodiment, the antenna unit 1 includes four fixed patch antennas 1a to 1d. Although the directivity of each patch antenna is fixed, it is possible to change the communication direction (directivity) of the entire antenna unit by switching the patch antenna to be used. Although the directivity of each patch antenna is fixed, it is possible to change allocation of a communication time of each communication direction by adjusting a selection time period of each patch antenna in switching control by the antenna control section 2. The switching control of the antenna may be performed using a physical switch, or may also be performed using an electronic switch (an electric or electronic circuit).

Figure 2A:
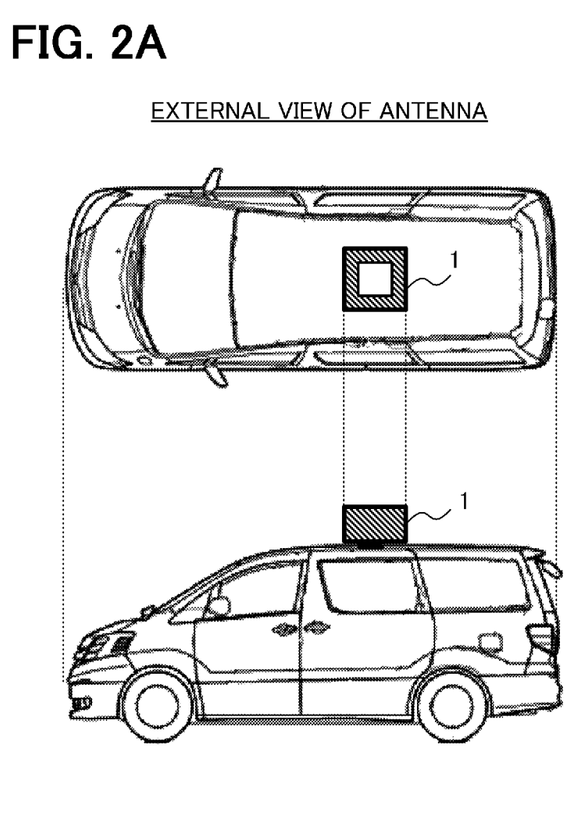
FIGS. 2A to 2C are views for explaining the configuration of an antenna in the embodiment.

As shown in FIG. 2A, the antenna unit 1 is installed on a roof of a vehicle, and the four patch antennas 1a to 1d are installed to be directed in forward, backward, left, and right directions. Each of the patch antennas 1a to 1d covers an angle range of 90 degrees.

Figure 2B:
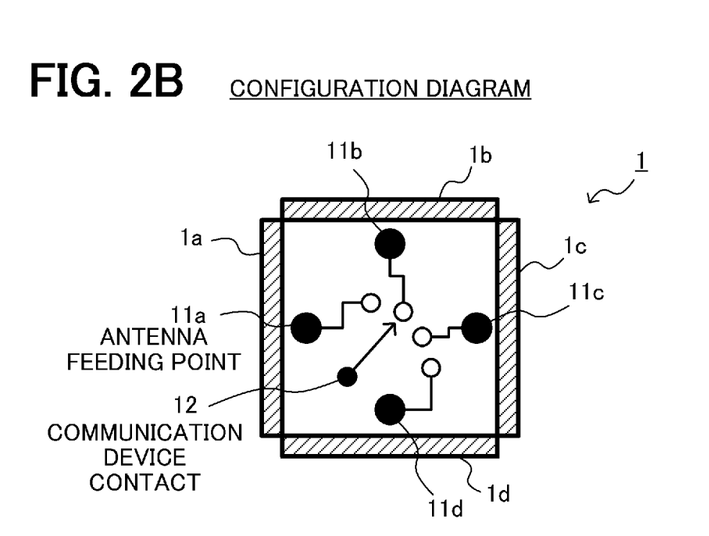

FIG. 2B is a view showing the configuration of the antenna unit 1 more specifically. The patch antennas 1a to 1d have antenna feeding points 11a to 11d respectively, and the antenna control section 2 can control the antenna to be turned ON by switching the selection of the antenna feeding point 11 connected to a contact 12 of the communication device. Although the directivity of each patch antenna is fixed, it is possible to temporally change the communication direction by the switching control by the antenna control section 2.

Figure 2C:
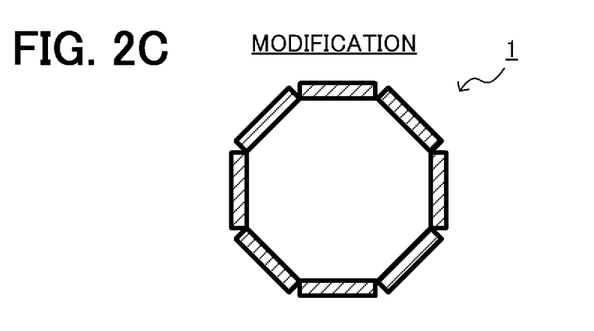
Figure 3A:
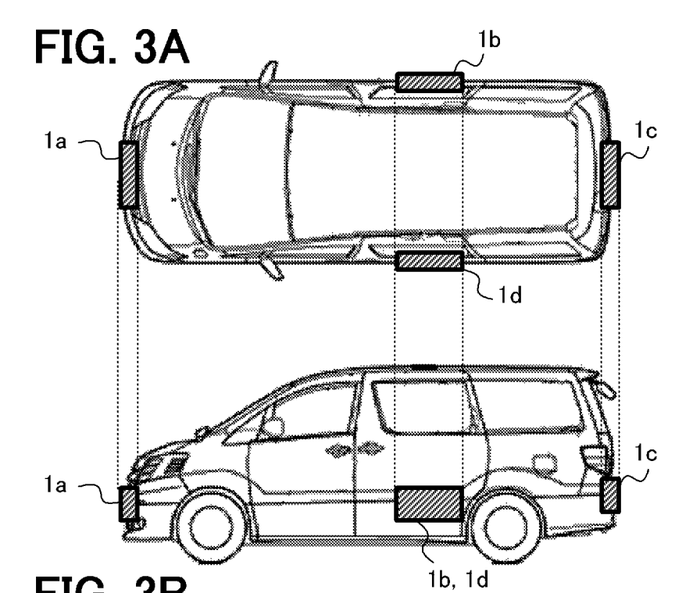
FIGS. 3A to 3D are views for explaining modifications of the configuration of the antenna.
Figure 3B:
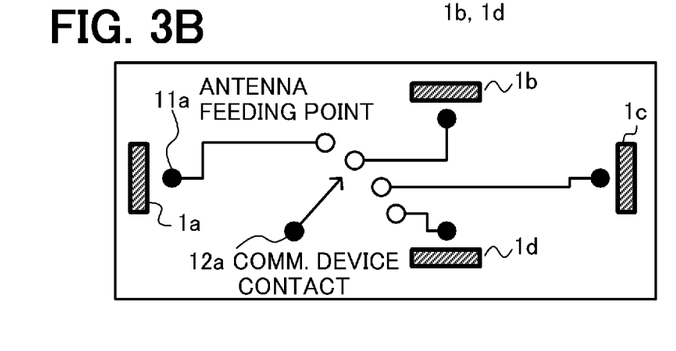

While an example in which the four patch antennas are used has been described in each of FIGS. 2A and 2B, eight patch antennas may also be used such that each patch antenna covers an angle range of 45 degrees, as shown in FIG. 2C. In addition, the same effect can be obtained by installing the patch antennas 1a to 1d at the front, rear, left, and right of the vehicle instead of installing them on the roof, as shown in FIGS. 3A and 3B.

Figure 3C:
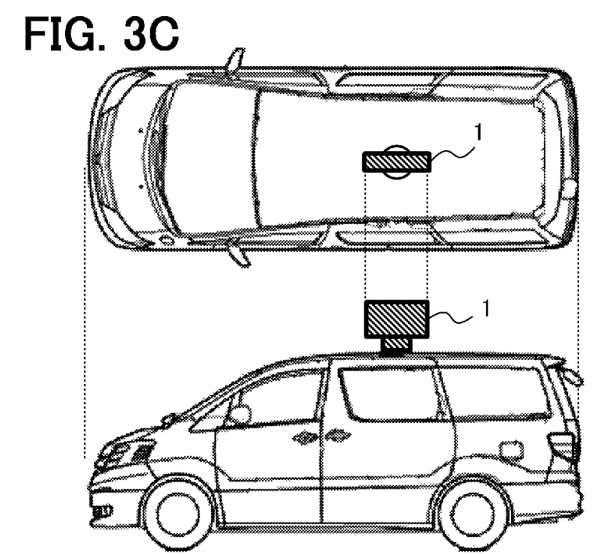
Figure 3D:
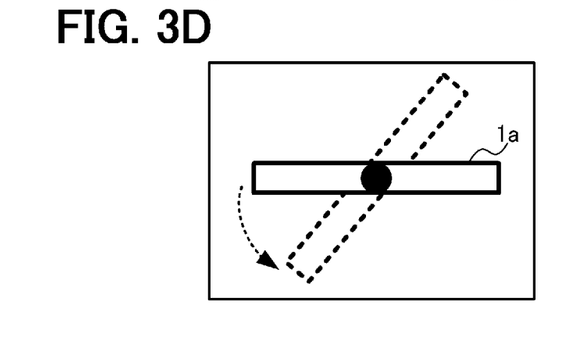

Further, as shown in FIGS. 3C and 3D, communication in each direction may be implemented by installing a rotary antenna on the roof of the vehicle and physically rotating the patch antenna on a horizontal plane in accordance with instructions from the antenna control section 2. The number of directions in which the communication can be performed during any time period is one, but the communication time of each direction can be adjusted by controlling a rotation speed. Furthermore, by making the rotation speed in a specific direction lower than in other directions, it is possible to increase the communication time of the specific direction.

Additionally, the communication direction may be changed temporally by using an adaptive antenna having beamforming capability as the antenna unit 1 and adjusting the directivity thereof.

The communication section 3 performs, among processes related to the communication, processes related to the physical layer and the MAC layer. The communication section 3 includes a reception section 3a and a transmission section 3b. The reception section 3a performs a received radio wave process (down-conversion, analog/digital (A/D) conversion, or the like) and demodulation on a radio signal received in a reception band via the antenna unit 1, and outputs the obtained signal to the upper layer process section 4. The transmission section 3b performs modulation and a transmitted radio wave process (up-conversion, digital/analog (D/A) conversion, or the like) on a signal generated by the upper layer process section 4, and transmits the signal via the antenna unit 1. The communication section 3 performs transmission and reception during a time slot determined by the communication control section 5. In the present embodiment, time synchronization is basically performed based on GPS time (absolute time) obtained from the GPS device 7.

The upper layer process section 4 performs protocol processes at layers above the MAC layer. Consequently, the upper layer process section 4 can determine a communication content type (e.g., communication related to vehicle control, communication related to entertainment, or communication related to road safety) of each communication partner based on received data received from the communication partner.

The communication control section 5 controls overall processes related to millimeter wave communication. Herein, among the processes controlled by the communication control section 5, the allocation (setting) of the communication time of each communication direction corresponding to a running environment will be mainly described. The communication control section 5 has subfunctional sections of a road condition acquisition section 51, a vehicle state acquisition section 52, and a communication direction setting section 53 in connection with communication time allocation control. The road condition acquisition section 51 and the vehicle state acquisition section 52 correspond to a running environment acquisition unit in the present disclosure.

The road condition acquisition section 51 acquires information related to conditions of a road on which a vehicle is running as part of the running environment. Examples of the road conditions include a road shape such as a straight road, a curve, or an intersection, a road type such as a freeway, an expressway, or a general road, an area type such as an urban area, a suburban area, or a rural area, the number of surrounding vehicles, and the number of surrounding roadside devices.

The road condition acquisition section 51 can acquire the running environment from sensor information obtained from the sensors 6. Examples of the sensors 6 include a camera, a radar, and a laser mounted on the vehicle. The road condition acquisition section 51 can extract the information related to the road conditions described above by performing image recognition processing on an image taken by the camera.

In addition, the road condition acquisition section 51 can acquire the information related to the road conditions based on the current position of the host vehicle obtained from the GPS device 7 and road information obtained from the navigation device 8. The navigation device 8 has map information that stores pieces of information such as the shape and type of the road in association with their positions, and can provide information related to the shape and type of the road corresponding to the position of the host vehicle. It is also possible to obtain the number of surrounding roadside devices from the map information. It is also possible to grasp the number of surrounding vehicles and the number of surrounding roadside devices based on wireless communication.

The vehicle state acquisition section 52 acquires control information of the vehicle from an on-vehicle network via the on-vehicle gateway 9. Examples of the control information of the vehicle include the speed (running speed) of the vehicle, an acceleration, an accelerator opening degree, a brake pedal depression amount, a running mode (manual driving/autonomous driving, running with battery power/fuel), and the remaining amount of fuel or electric power. It is possible to obtain these pieces of information from a vehicle control ECU in the on-vehicle network.

The communication direction setting section 53 determines the setting of the communication direction of the host vehicle based on the running environment obtained from the road condition acquisition section 51 and the vehicle state acquisition section 52. A specific determination method will be described later with reference to a flowchart. The communication direction setting section 53 determines the temporal allocation of the communication direction, and outputs the determined allocation thereof to the antenna control section 2 as antenna control information. The antenna control section 2 controls the antenna unit 1 according to the antenna control information to thereby switch the communication direction of each time. The determination of the communication direction relates to the determination of the communication partner. Consequently, the communication direction setting section 53 supplies communication direction setting information of each time to the transmission section 3b such that the transmission section 3b can select a time slot and the communication partner to which the information is to be transmitted during the time slot.

Each functional section described above may be implemented by an electric or electronic circuit, or may also be implemented by execution of a program stored in a storage device by a central processing unit (CPU), a digital signal processor (DSP), or a field programmable gate array (FPGA). That is, the vehicle-mounted millimeter-wave transmission device according to the present embodiment may be implemented by a combination of a computer and software, may be implemented by a hardware circuit, or may also be implemented by a combination thereof.

The sensors 6, the navigation device 8, and the on-vehicle gateway 9 are described above, and hence the repeated description thereof will be omitted.

The GPS device 7 is used to acquire the position information on the vehicle and the current time. Note that it is possible to use any position information acquisition device and any time information acquisition device other than the GPS device as long as the devices can acquire the same information. For example, as the position information acquisition device, a positioning device that uses a satellite positioning system other than GPS (a global navigation satellite system such as Galileo, GLONASS, or Compass, or a regional navigation satellite system such as BDS or DORIS), or a base station positioning device may be used.

Process

Figure 4:
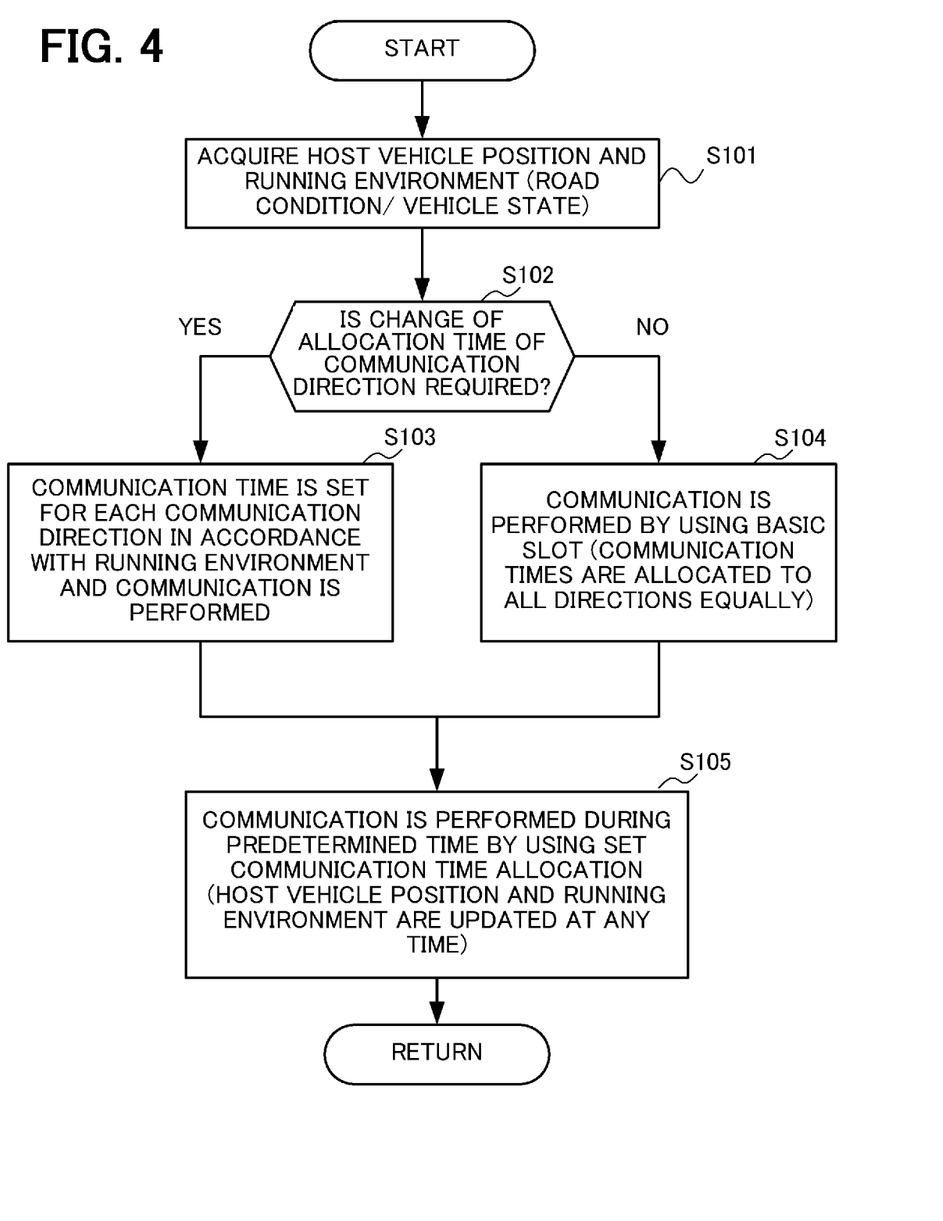
FIG. 4 is a flowchart showing procedures of a communication control process in the embodiment.

FIG. 4 is a flowchart showing a communication control process in the present embodiment. The process shown in FIG. 4 is repeatedly executed every predetermined time (e.g., 1 second, 3 seconds, or 5 seconds).

In Step S101, the communication control section 5 acquires the position of the host vehicle and the information related to the running environment. As described above, the road condition acquisition section 51 acquires the information related to the road conditions, and the vehicle state acquisition section 52 acquires the information related to the control state of the host vehicle.

In Step S102, the communication direction setting section 53 determines whether or not the running environment requires change of the allocation time of the communication direction from a default setting. When the running environment requires the change of the allocation time of the communication direction (S102—YES), the process proceeds to Step S103, and the communication direction setting section 53 allocates the communication time longer than those allocated to the other directions to the direction corresponding to the running environment, and communication is performed. On the other hand, when the running environment does not require the change of the allocation time of the communication direction (S102—NO), the process proceeds to Step S104, and the communication direction setting section 53 allocates the communication times that are equal to each other to all directions, and the communication is performed.

In Step S105, the communication is performed during a predetermined time by using the communication time allocation set in Step S103 or S104. When the predetermined time elapses, the procedures from Step S101 are repeatedly executed. Note that the position of the host vehicle and the information of the running environment are updated at any time during the execution of the communication based on the set communication time allocation.

Operation Example

As the running environment in which the long communication time is to be allocated to a specific direction, the following environments are assumed.

During running on a freeway (including an expressway) . . . the long communication times are set for forward and backward directions of the vehicle During running on a straight road . . . the long communication times are set for the forward and backward directions of the vehicle During running at high vehicle speed . . . the long communication times are set for the forward and backward directions of the vehicle During running on a curved road . . . the long communication time is set for a direction along a curve During passing through an intersection . . . the communication times are set for all directions equally During reverse driving . . . the long communication time is set for the backward direction During putting the vehicle into a garage . . . the long communication time is set for the backward direction During manual driving . . . the long communication times are set for the forward and backward directions During autonomous driving . . . the communication times are set for all directions equally During EV running . . . the communication times are set for all directions equally In the case where the vehicle is running on the freeway (including the expressway) or the straight road, or running at high vehicle speed, the vehicles in the forward and backward directions often become the communication partners, and are the vehicles with which the host vehicle should communicate closely from the viewpoint of road safety. Consequently, it is preferable to set the long communication times for the forward and backward directions in such a situation. In addition, for the same reason, the long communication time should be set for the direction along the curve during running on the curved road, and the long communication time should be set for the backward direction during reverse driving or during putting the vehicle into the garage. During passing through the intersection, the host vehicle should communicate with vehicles and roadside devices in all directions instead of a vehicle or a roadside device in a specific direction, and hence it is preferable to set the communication times for all directions equally.

The reason why the long communication times are set for the forward and backward directions during manual driving and the communication times are set for all directions equally during autonomous driving is that it is necessary to provide information on the forward and backward directions that is more important in terms of road safety to more drivers during manual driving. During autonomous driving, even when the communication times are allocated equally, it is possible to perform safe control.

The communication times are set for the directions equally during EV running (or during running in an EV mode of a PHV vehicle) in order to allow communication with a charging station installed on the roadside to be performed more reliably. Note that, even during EV running, the communication times may not be allocated to all directions equally in the case where the remaining amount of electric power is sufficient, and the communication times may be allocated to the directions equally in the case where the remaining amount of electric power is not more than a threshold value.

Figure 5A:
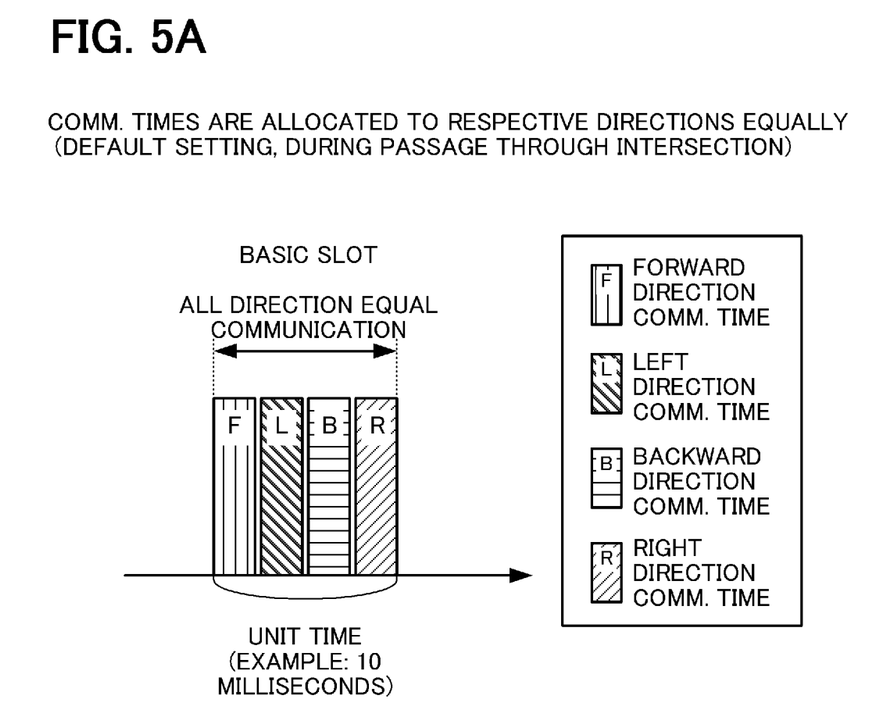
FIGS. 5A to 5C are views for explaining an example of communication time allocation in the embodiment.

FIG. 5A is a view for explaining the case where the communication times are allocated to all communication directions equally (the procedure in Step S104). Herein, a description will be made by using 10 milliseconds as one unit time (communication cycle). In the case where the communication times are allocated to all directions equally, 10 milliseconds serving as the unit time is quartered, and 2.5 milliseconds is allocated to each of forward, backward, left, and right directions as the communication time. By using this basic slot repeatedly, it is possible to obtain communication opportunities equally with communication partners in all directions.

Figure 5B:
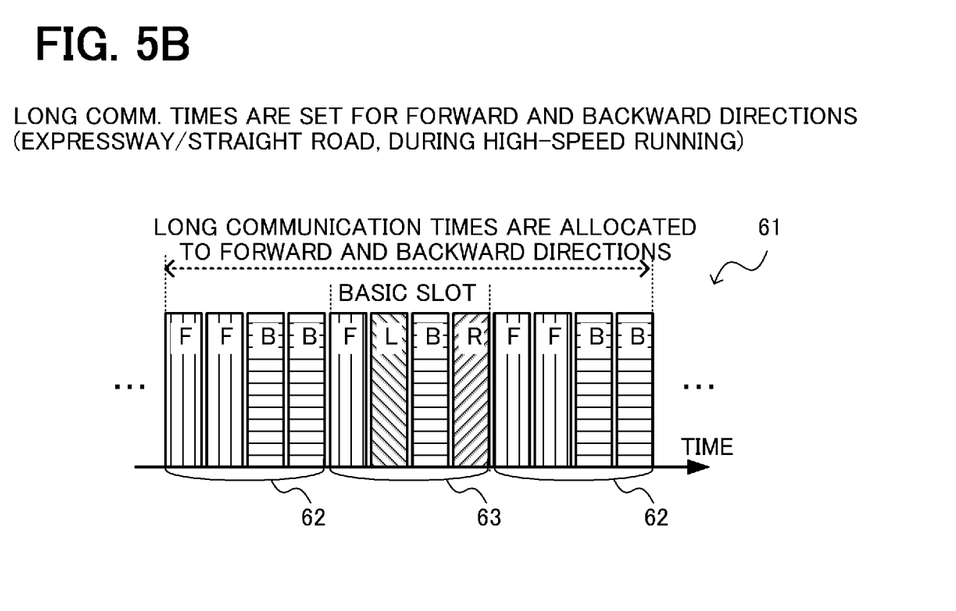

FIG. 5B is a view for explaining the case where the long communication times are allocated to the forward and backward directions (an example of the procedure in Step S103). For example, running on the straight road or running at high speed corresponds to this case. Herein, an allocation time period 61 consisting of three unit time periods 62, 63, and 62 is used as one unit, and the communication is performed by repeating the unit. The communication direction setting section 53 sets the communication times only for the forward and backward directions during the time period 62. Specifically, 5 milliseconds is allocated to the communication in each of the forward and backward directions equally. During the next time period 63, the communication times are allocated to all directions equally. As a whole, the communication is controlled such that the time period 62 during which the long communication times are set for the forward and backward directions and the communication is performed, and the time period 63 during which the communication times are set for all directions equally and the communication is performed are alternately set.

Figure 5C:
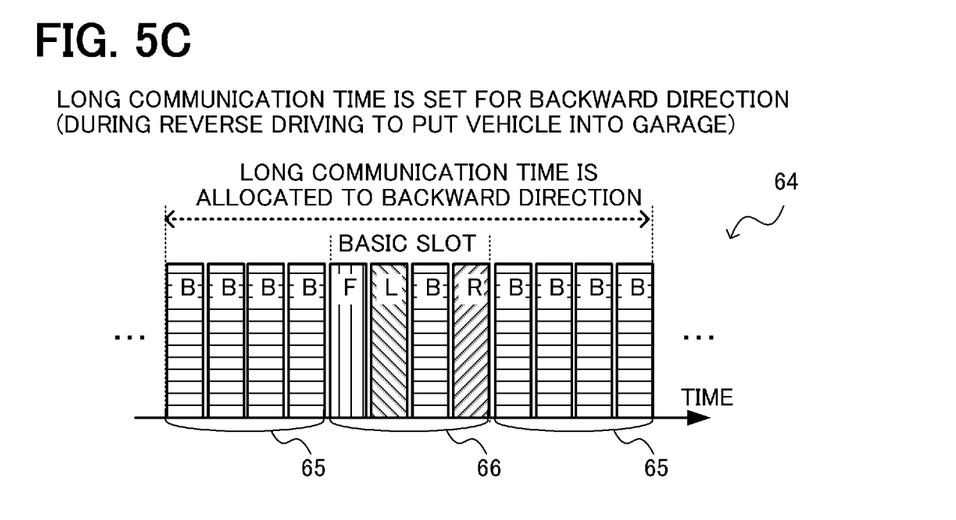

FIG. 5C is a view for explaining the case where the long communication time is allocated to the backward direction (an example of the procedure in Step S103). For example, reverse driving to put the vehicle into the garage corresponds to this case. In this example, an allocation time period 64 consists of a time period 65 during which the communication time is allocated only to the backward direction, and a time period 66 during which the communication times are allocated to all directions equally.

Thus, in the present embodiment, the time period (62, 65) during which the communication time is allocated only to the specific direction, and the time period (63, 66) during which the communication times are allocated to all directions equally are alternately combined. With this, as a whole, it is possible to allocate the communication time longer than those allocated to the other directions to the direction in which the communication time is needed in accordance with the running environment. It is possible to perform communication having a larger communication volume reliably in a short time by allocating the long communication time to the important direction, and it is possible to keep communication with the other communication partners by allocating the communication times to the other directions.

A time ratio between the time period during which the communication time is allocated only to the specific direction and the time period during which the communication times are allocated to all directions equally is 2 to 1 in the above example, but any ratio other than the above ratio may be set. The time periods may be set to be equal to each other, and the time period of the equal allocation may be set to be longer than the other time period.

Advantageous Effect of Present Embodiment

According to the present embodiment, in the communication that uses the millimeter wave having high straightness, by allocating the longer communication time to the specific direction corresponding to the running environment, it becomes possible to communicate with the communication partner positioned in the direction more reliably, and perform large-volume communication in a short time. Further, since the communication times are allocated to the other directions, it is possible to keep communication with the communication partners positioned in the other directions. That is, it is possible to increase the throughput of the communication with the communication partner in the important direction corresponding to the running environment while allowing the communication with the communication partners present in all directions, and it becomes possible to obtain both of high efficiency and high availability.

To allow the communication in all direction, it is possible to provide the antenna and a radio communication process section in each communication direction, but this arrangement increases the number of the radio communication process sections and cost. In the present embodiment, by handling the communication in each direction based on time-sharing by using one radio communication process section (communication section), it is possible to prevent an increase in cost.

Modification

In the above description, the description has been made on the assumption that the allocated communication time is fixed when the communication in which the long communication time is allocated to the specific direction is performed. However, it is also preferable to vary the allocation of the communication time depending on the situation. For example, a vehicle speed level may be classified into three or more levels by providing a plurality of threshold values of the vehicle speed, and the communication time allocated to each of the forward and backward directions may be made longer as the vehicle speed level is higher.

In addition, in the above description, the description has been made on the assumption that the communication time allocation of each communication direction is set based on one piece of information of the running environment. However, in the above embodiment, it is also preferable to set the communication time of each communication direction in consideration of a plurality of pieces of information included as running environment information. For example, consideration is given to the case where the vehicle is running at high speed in the EV mode, and remaining battery power is low. The high vehicle speed supports the communication time allocation in which the long communication times are allocated to the forward and backward directions, but the low remaining battery power supports the communication time allocation in which the communication times are allocated to all directions more equally. In such a situation, an importance score may be set for each running environment information, and the communication time allocated to each of the forward and backward directions, which is longer than those allocated to the other directions, may be determined according to the importance score. Herein, the description has been given of the process in an example in which the case where the forward and backward directions are considered to be important and the case where all directions are equally handled coexist, and the same process can be used, e.g., when the case where the forward and backward directions are considered to be important and the case where the left and right directions are considered to be important coexist. In addition, the same process can be used in the communication time allocation based on three or more pieces of the running environment information.

In addition, in the above description, while the communication time allocation of each communication direction is set based only on the running environment (the road conditions and the vehicle state), the communication time allocation may also be set in consideration of other pieces of information. For example, the longer communication time may be allocated to the direction in which the communication partner is present.

Others

In the embodiments described above, an example in which the antennas directed in four or eight directions are switchably used, and an example in which the antenna is rotated have been described. However, it is possible to adopt configurations other than the above configurations. In the case where a plurality of the antennas are used, the number of the antennas is not limited to four or eight, and the number thereof may be more than or less than four or eight. In addition, the directivity may be switched by using an adaptive antenna capable of changing the directivity by beamforming. Further, the communication direction may be changed by using both of switching of the antenna to be used and beamforming by using a plurality of the adaptive antennas that are directed in different directions.

In addition, in the above description, the communication time allocation is determined by using the communication time period of 10 milliseconds consisting of four slots each having 2.5 milliseconds as one unit, but the determination of the communication time allocation is not limited to the above mode. The allocation of the communication time may be changed by using a longer unit.

The present invention can be appropriately modified and implemented without departing from the scope of the technical idea of the invention.

What is claimed is:

1. A vehicle-mounted millimeter-wave communication device mounted on a vehicle and performing communication while temporally changing a communication direction by using an antenna unit capable of changing directivity, the device comprising:
    a running environment acquisition unit configured to acquire a running environment including at least one of a road condition of a road on which the vehicle is running, and a vehicle state of the vehicle; and
    a communication control unit configured to, in accordance with the running environment, perform control to:
        determine an allocation of a communication time to each of a plurality of communication directions; and
        communicate based on the determined allocation.

2. The vehicle-mounted millimeter-wave communication device according to claim 1,
    wherein the running environment includes the road condition of the road on which the vehicle is running, and
    wherein the communication control unit sets a communication time longer than a communication time set for another direction for each of forward and backward directions in a case where the vehicle is running on a straight road, and sets communication times for all directions equally in a case where the vehicle is passing through an intersection.

3. The vehicle-mounted millimeter-wave communication device according to claim 1,
    wherein the running environment includes the road condition of the road on which the vehicle is running, and
    wherein in a case where the vehicle is running on a freeway, the communication control unit sets a longer communication time, which is longer than the communication time set for the other direction, for each of the forward and backward directions than in a case where the vehicle is running on a general road.

4. The vehicle-mounted millimeter-wave communication device according to claim 1,
    wherein the running environment includes a running speed of the vehicle, and
    wherein in a case where the running speed is not less than a threshold value, the communication control unit sets a longer communication time, which is longer than the communication time set for the other direction, for each of the forward and backward directions than in a case where the running speed is less than the threshold value.

5. The vehicle-mounted millimeter-wave communication device according to claim 1,
    wherein the running environment includes indication of whether or not the vehicle is in a driving mode that uses a battery as a power source, and
    wherein in a case where the vehicle is in the driving mode that uses the battery as the power source, the communication control unit sets the communication times for all the directions more equally than in a case where the vehicle is not in the driving mode that uses the battery as the power source.

6. The vehicle-mounted millimeter-wave communication device according to claim 1,
    wherein the running environment includes remaining battery power of the vehicle, and
    wherein in a case where the remaining battery power is not more than a threshold value, the communication control unit sets the communication times for all the directions more equally than in a case where the remaining battery power is more than the threshold value.

7. The vehicle-mounted millimeter-wave communication device according to claim 1, wherein, in a case where it is determined that the communication time longer than the communication time set for the other direction is set for a specific direction based on the running environment, the communication control unit performs control such that communication, in which the communication time longer than the communication time set for the other direction is set for the specific direction, and communication, in which the communication times are set for all the directions equally, are performed alternately.

8. The vehicle-mounted millimeter-wave communication device according to claim 1, further comprising:
    the antenna unit, the antenna unit having a plurality of fixed antennas directed in different directions,
    wherein the communication control unit changes a setting of the communication time of each direction by adjusting a selection time period when the plurality of fixed antennas are switchably used.

9. The vehicle-mounted millimeter-wave communication device according to claim 1, further comprising:
    the antenna unit, the antenna unit having a rotary antenna,
    wherein the communication control unit changes the setting of the communication time of each direction by adjusting a rotation speed of the rotary antenna.

10. A communication control method in a vehicle-mounted millimeter-wave communication device that is mounted on a vehicle and performs communication while temporally changing a communication direction by using an antenna unit capable of changing directivity, the control method comprising:
    acquiring a running environment including at least one of a road condition of a road on which the vehicle is running and a vehicle state of the vehicle; and
    in accordance with the running environment, performing control to:
        determine an allocation of a communication time to each of a plurality of communication directions; and
        communicate based on the determined allocation.

11. A non-transitory computer-readable medium storing a program for causing a computer to execute the steps of the method according to claim 10.

12. The vehicle-mounted millimeter-wave communication device according to claim 1, wherein the communication control unit determines which of: (a) communication performed by equally setting the communication time in all directions; and (b) communication performed by setting a longer communication time than other directions with respect to a specific direction, is to be performed, according to the running environment.

\* \* \* \* \*